US008651998B2

(12) United States Patent
Schenk et al.

(10) Patent No.: US 8,651,998 B2
(45) Date of Patent: Feb. 18, 2014

(54) METHOD FOR CONTROLLING A HYBRID DRIVE

(75) Inventors: Rene Schenk, Tamm (DE); Oliver Kaefer, Murr (DE); Thorsten Juenemann, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 1132 days.

(21) Appl. No.: 12/304,157

(22) PCT Filed: Aug. 14, 2007

(86) PCT No.: PCT/EP2007/058390
§ 371 (c)(1), (2), (4) Date: Nov. 13, 2009

(87) PCT Pub. No.: WO2008/043593
PCT Pub. Date: Apr. 17, 2008

(65) Prior Publication Data

US 2010/0056328 A1 Mar. 4, 2010

(30) Foreign Application Priority Data

Oct. 12, 2006 (DE) ........................ 10 2006 048 358

(51) Int. Cl.
*B60W 10/02* (2006.01)

(52) U.S. Cl.
USPC .............................................. 477/5; 477/181

(58) Field of Classification Search
USPC ................ 477/5, 174–176, 180, 181; 701/68; 903/912, 914
See application file for complete search history.

(56) References Cited

U.S. PATENT DOCUMENTS 6,018,198 A 1/2000 Tsuzuki et al.
6,336,889 B1 * 1/2002 Oba et al. .......................... 477/5
6,364,807 B1 * 4/2002 Koneda et al. .................... 477/5
7,360,616 B2 * 4/2008 Schiele .................... 180/65.265
7,874,956 B2 * 1/2011 Kouno ............................. 477/5
8,105,205 B2 * 1/2012 Reuschel ...................... 477/181
8,142,328 B2 * 3/2012 Reuschel .......................... 477/6
2005/0090370 A1 4/2005 Berger et al.
2007/0157899 A1 7/2007 Seufert et al.
2007/0207892 A1 9/2007 Dreibholz et al.

FOREIGN PATENT DOCUMENTS

| | | |
|---|---|---|
| DE | 198 38 853 | 3/1999 |
| DE | 103 16 422 | 12/2003 |
| DE | 10 2006 005 468 | 8/2007 |
| EP | 1 860 012 | 11/2007 |
| WO | WO 2005/100777 | 10/2005 |

OTHER PUBLICATIONS

International Search Report, PCT/EP2007/058390, dated Feb. 13, 2008.

* cited by examiner

*Primary Examiner* — Erin D Bishop
*Assistant Examiner* — Huan Le
(74) *Attorney, Agent, or Firm* — Kenyon & Kenyon LLP

(57) ABSTRACT

A method is for controlling a hybrid drive of a vehicle, which includes at least one internal combustion engine and at least one electric machine, having a first clutch situated between the electric machine and the drive train of the vehicle and a second clutch situated between the electric machine and the internal combustion engine. In the method, a predefinable clutch torque is applied to the second clutch for a start of the internal combustion engine by the operating electric machine, the rotational speed of the internal combustion engine is monitored, and the clutch torque is incremented to a higher value if the rotational speed of the internal combustion engine is less than a predefinable threshold value within a predefinable time interval.

19 Claims, 5 Drawing Sheets

100

8 2 3 4 5 6 7 1

100
1
2
3
4
5
6
7
8
+
−

METHOD FOR CONTROLLING A HYBRID DRIVE

FIELD OF THE INVENTION

The present invention relates to a method for controlling a hybrid drive of a vehicle.

BACKGROUND INFORMATION

The generic hybrid drive includes at least one internal combustion engine, at least one electric machine, and at least one clutch between the internal combustion engine and the electric machine, as well as between the electric machine and the downstream drive train of the vehicle. As the existing drive arrangements in the automobile industry regarding consumption optimization, emission reduction, and the improvement of the subjective driving experience are being refined, hybrid drives are becoming more and more important. They have, in addition to the internal combustion engine, at least one additional drive source which is not operated using fossil fuels. Using an appropriate operating strategy, the advantages of the different drive sources may be made optimum use of, while compensating for their disadvantages. The combination of an internal combustion engine with electric machines as alternative drive sources is a dominant variant within the automobile industry. A series of different hybrid vehicles have already been designed for mass production or almost-mass production. The common feature of all is that, compared to vehicles driven conventionally by internal combustion engines, they consume less fuel. The consumption savings is due to the hybrid-specific options of energy recovery during braking and to the implementation of start-stop functions. In hybrid drives a distinction is made between parallel, series, and split hybrids. The common feature of all is the use of two energy accumulators, a battery and a fuel tank. Capacitors may also be considered as energy accumulators as an alternative to batteries. Another distinctive feature of hybrid drives is the performance of the electric machines. A distinction is made between mild and full hybrid variants, a so-called full hybrid being understood as a vehicle which is capable of being driven by the electric drive alone. So-called power-branching hybrid drives will not be discussed herein because these drives are started differently and therefore the underlying problem hereof does not exist. So-called starter-generators are also conventional. However, since in such devices the electric machine is fixedly connected to the crankshaft of the vehicle, the problem of synchronization during operation does not exist.

SUMMARY

Example embodiments of the present invention provide a clutching operation in a vehicle having a hybrid drive designed as a parallel hybrid.

Example embodiments of the present invention make it possible to improve the clutching operation in a vehicle which is equipped with a hybrid drive designed as a parallel hybrid. An additional clutch designed as a proportional clutch is provided here between the internal combustion engine and an electric machine. A configuration of this type allows the vehicle to be driven using the electric machine in the disengaged state of this additional clutch. The problem here is that in the event of increased power requirement or decreasing charge state of the battery, the internal combustion engine must be started without causing interference in the drive train. The start of the internal combustion engine is achieved by engaging this additional clutch. This clutch must, however, be controlled in such a way that, on the one hand, the torque is sufficient to bring the internal combustion engine to a rotational speed required for a successful start. On the other hand, the torque used for accelerating the internal combustion engine must be the lowest possible, since it must be additionally applied by the electric machine and kept in reserve. The present invention makes it possible to optimize this clutching operation, although the said clutch type has a broad tolerance range due to manufacturing tolerances, temperature effects, and aging effects. Furthermore, changes in the torque of the internal combustion engine due to temperature and aging may also be taken into account.

Example embodiments of the present invention are described in greater detail below with reference to the drawings.

DETAILED DESCRIPTION

Figure 1:
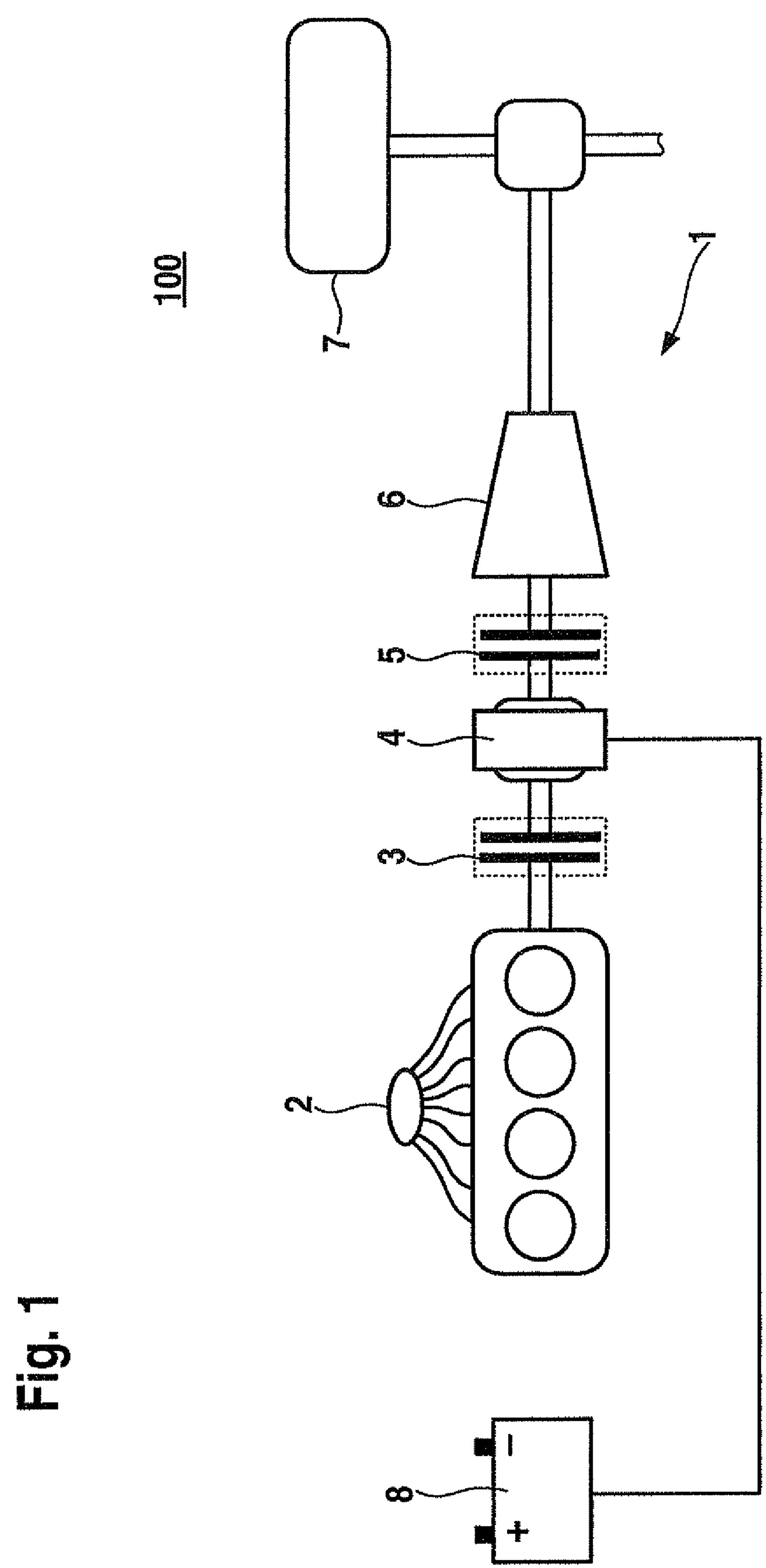
FIG. 1 schematically shows a vehicle having a hybrid drive.

Example embodiments of the present invention are elucidated in greater detail below with reference to the drawings. FIG. 1 schematically shows a vehicle 100 having a hybrid drive 1. Hybrid drive 1 includes a conventional internal combustion engine 2 and an electric machine 4. A first clutch 5 is situated between electric machine 4 and the schematically represented drive train identified by reference numeral 6. A second clutch 3 is situated between internal combustion engine 2 and electric machine 4. This is preferably a proportional clutch. The chassis of vehicle 100 is indicated by a wheel 7 and a portion of an axle including a differential. A battery supplying electric machine 4 with power is identified by reference numeral 8. Further components of the vehicle electrical system are not illustrated in FIG. 1. Hybrid drive 1 illustrated in FIG. 1 allows vehicle 100 to be driven electrically only by electric machine 4. In this case second clutch 3 situated between internal combustion engine 2 and electric machine 4 is disengaged. However, when the charge state of battery 8 drops to an excessively low level or more power is required, internal combustion engine 2 must be started. This is made possible by engaging second clutch 3. However, this should not cause interference in drive train 6 of vehicle 100 if possible. For this purpose, clutch 3 is controlled to a defined slip torque. This slip torque causes internal combustion engine 2 to accelerate until it has reached the same rotational speed as that of electric machine 4. Clutch 3 is then fully engaged and internal combustion engine 2 may transmit a torque to drive train 6 of vehicle 1.

The additional torque during the slip phase, referred to hereinafter also as slip torque, must be provided by electric machine 4. Clutch 3 must be controlled in such a way that, on the one hand, the torque transmitted to internal combustion engine 2 is sufficient to bring internal combustion engine 2 to a rotational speed required for a successful start. On the other hand, the torque needed for accelerating internal combustion engine 2 must be as low as possible, since it must be additionally applied by electric machine 4 and therefore kept in reserve.

The problem in correctly adjusting the slip torque is that the clutch type used has a relatively great tolerance. This is caused by manufacturing tolerances as well as temperature effects and aging effects. For example, the friction coefficient may change with increasing age of clutch 3.

The slip torque is normally specified only via the pressing force because accurate measurement of the slip torque and its control as a function of the measurement would be too complicated in practice. In addition, the torque needed for successfully starting internal combustion engine 2 may also change as a function of temperature and age.

Figure 2:
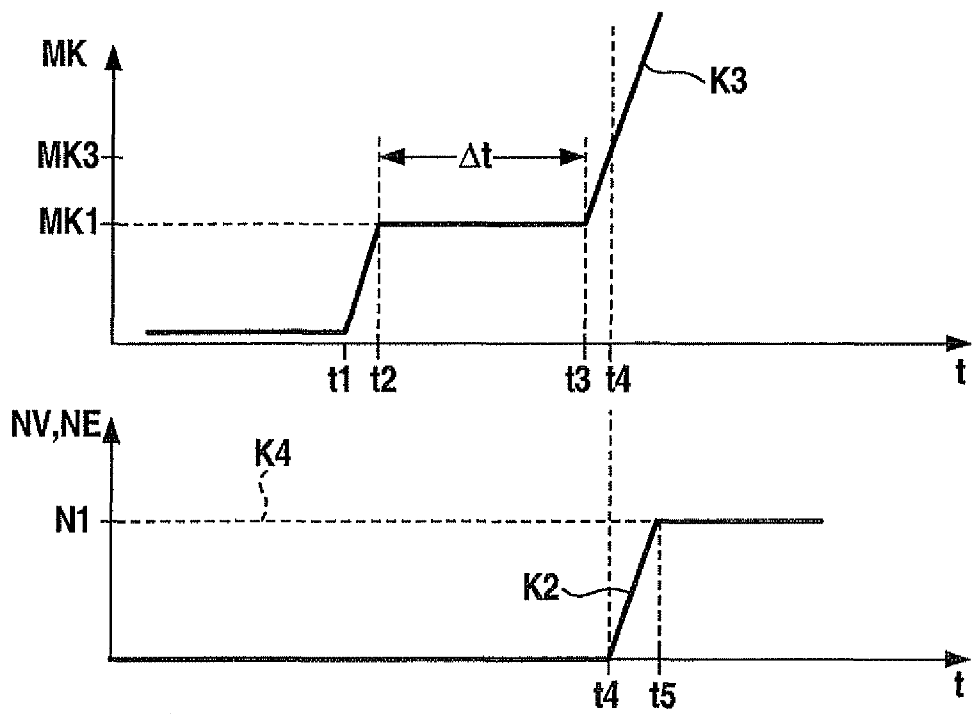
FIG. 2 shows rotational speed and slip torque as a function of time in a diagram.

The disadvantageous effect of an excessively low slip torque is elucidated below with reference to the diagram shown in FIG. 2. The diagram shown on the top of FIG. 2 shows clutch torque MK as a function of time t. Curve K3 represents the clutch torque of clutch 3 in FIG. 1. The diagram shown on the bottom of FIG. 2 shows rotational speeds NE, NV as a function of time t. NE denotes the rotational speed of electric machine 4 and NV denotes the rotational speed of internal combustion engine 2. Curve K2 shows the rotational speed of internal combustion engine 2 and curve K4 shows the rotational speed of electric machine 4 as a function of time t. It is assumed that vehicle 100 is driven exclusively by electric machine 4 up to point in time t1. At this point in time it is determined that more power is needed, which may no longer be supplied by electric machine 4 alone. This additional power should be supplied by internal combustion engine 2, which must be started for this purpose. The start is initiated by controlling clutch 3. By partially engaging clutch 3, a slip torque MK1, which is applied at point in time t2, is set. Although there is slippage and electric machine 4 rotates at rotational speed N1 (see curve K4), curve K2 shows that internal combustion engine 2 continues at rest. This means that slip torque MK1 is insufficient for overcoming the break-loose torque of internal combustion engine 2. Break-loose torque is to be understood as the torque needed for successfully compressing internal combustion engine 2. This situation is determined by the control system of hybrid drive 1 after the elapse of a predefinable time interval Δt at point in time t3, for example, by starting a timing element having time constant Δt when slip torque MK1 is reached at point in time t2. Therefore, at point in time t3 the slip torque is increased further to value MK3, resulting in internal combustion engine 2 being set into rotation, and, as curve K2 shows, reaching rotational speed N1 of electric machine 4 at point in time t5. A successful start of internal combustion engine 2 may now be assumed. The disadvantages here are an extension of the start time, an increased power consumption for the extended slip phase, and an increased clutch wear.

Figure 3:
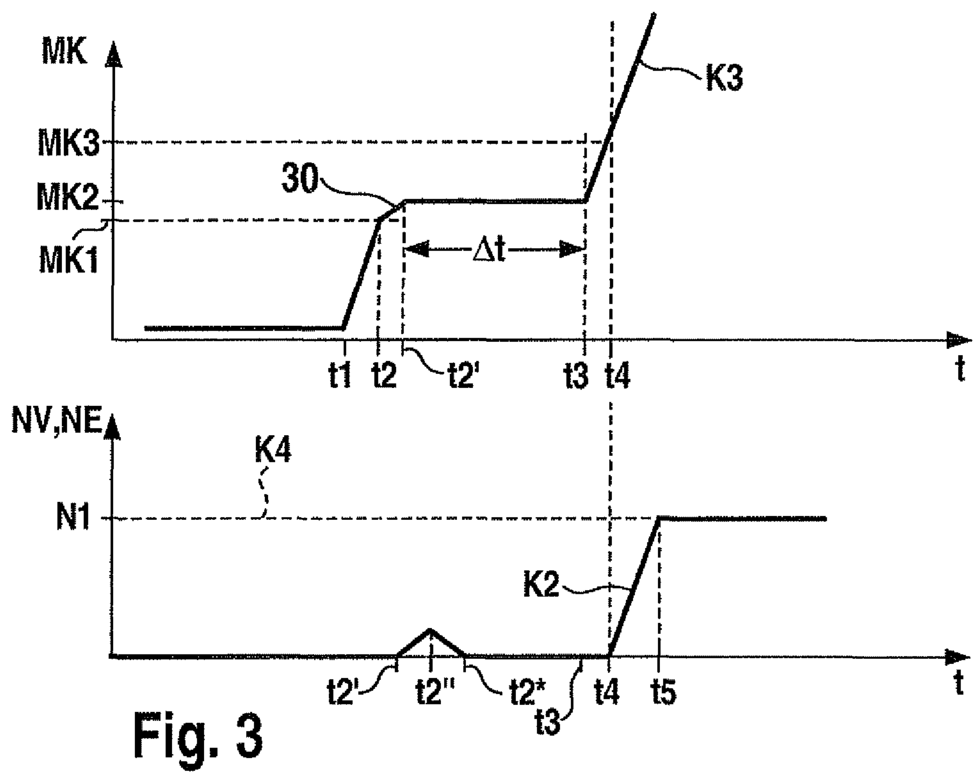
FIG. 3 shows rotational speed and slip torque as a function of time in a diagram.

It may now be attempted to bring clutch torque MK rapidly to a minimum value, then to increase it again using a ramp until internal combustion engine 2 starts rotating and then to freeze it again. This is described with reference to the diagram shown in FIG. 3. The diagram on the top of FIG. 3 shows again clutch torque MK as a function of time t. The diagram shown on the bottom of FIG. 3 shows rotational speed N as a function of time t. Curve K2 shows the rotational speed of internal combustion engine 2, and curve K4 shows the rotational speed of electric machine 4. It is assumed that vehicle 100 is driven exclusively by electric machine 4 up to point in time t1. At this point in time it is determined that more power is needed, which may no longer be supplied by electric machine 4 alone. This additional power should be supplied by internal combustion engine 2, which must be started for this purpose. The start is initiated by controlling clutch 3. By partially engaging clutch 3, a slip torque MK1 is set, which is applied at point in time t2. Since internal combustion engine 2 has not yet been set into motion, the slip torque is increased further at point in time t2. This may take place, for example, along a ramp 30, which lets the slip torque increase linearly. At point in time t2', the slip torque reaches value MK2 and internal combustion engine 2 begins to rotate. Slip torque MK2 is subsequently held constant. However, at point in time t2" the rotational speed of internal combustion engine 2 drops again and at point in time t2* it comes to a rest again. The start attempt was thus unsuccessful. This may be attributed to the fact that, as a function of the rest position of the crankshaft, a rotation start of internal combustion engine 2 could initially be achieved, but the rotation came to a standstill again as the compression increased. Not until the slip torque is raised to value MK3, as in FIG. 2, after the elapse of a time interval Δt determined by a timing element, is internal combustion engine 2 successfully set into rotation. At point in time t5, internal combustion engine 2 has reached rotational speed N1 of electric machine 4 again. Only now may a successful start of internal combustion engine 2 be assumed. Also in this case, an extension of the start time is in turn to be taken into account. Furthermore, internal combustion engine 2 more often starts rotating, but it stops again on reaching its compression position.

In the following, it will be described how the clutch torque is adapted in order to achieve a reliable start of the internal combustion engine as rapidly as possible. First, the case where drive train 6 is not clutch-connected, i.e., clutch 5 is disengaged, will be discussed. In the case of an automatic transmission, this would correspond to position P or N. Since no other load is acting on electric machine 4, the only possibility is to adjust the clutch torque of clutch 3 to the torque of electric machine 4. To do so, clutch 3 is initially engaged while electric machine 4 is at rest. Subsequently electric machine 4 and internal combustion engine 2 are jointly brought up to speed. For the adjustment, clutch 3 is, prior to initiating the start sequence, brought to a value that is less than the normal value for the slip torque provided for the start, for example, to 90%. Electric machine 4 is then brought up to speed. If internal combustion engine 2 starts at this time, the setpoint value is reduced for the future. If internal combustion engine 2 does not start, the clutch torque is increased, for example, along a ramp, until internal combustion engine 2 starts. The clutch torque required therefor is saved and, possibly increased by a safety margin, saved as a new setpoint value of the slip torque. At the same time, the torque of electric machine 4 required for starting internal combustion engine 2 is saved. A correction factor which is used for controlling the speed governor is ascertained from the ratio of the clutch torque of clutch 3 and the torque of electric machine 4. To keep the start time as short as possible, it is advisable to start this test at a value just below the expected value of the torque of clutch 3. Although this results in only a small correction to be made in each case, the ramp does not have to be run for a long time in order to achieve a successful start of internal combustion engine 2.

As long as internal combustion engine 2 has to be restarted during the operation of vehicle 100, the following procedure is advisable. As soon as the setpoint value of the slip torque of clutch 3 is reached, a timing element is started. If, after the elapse of the time period predefined by the timing element, a rotation of internal combustion engine 2 has still not been detected, the slip torque is incremented by a predefinable amount or by a predefinable percentage for the next start attempt. Alternatively, the actual value of the slip torque which had resulted in a successful start may be predefined as the next setpoint value.

Figure 4:
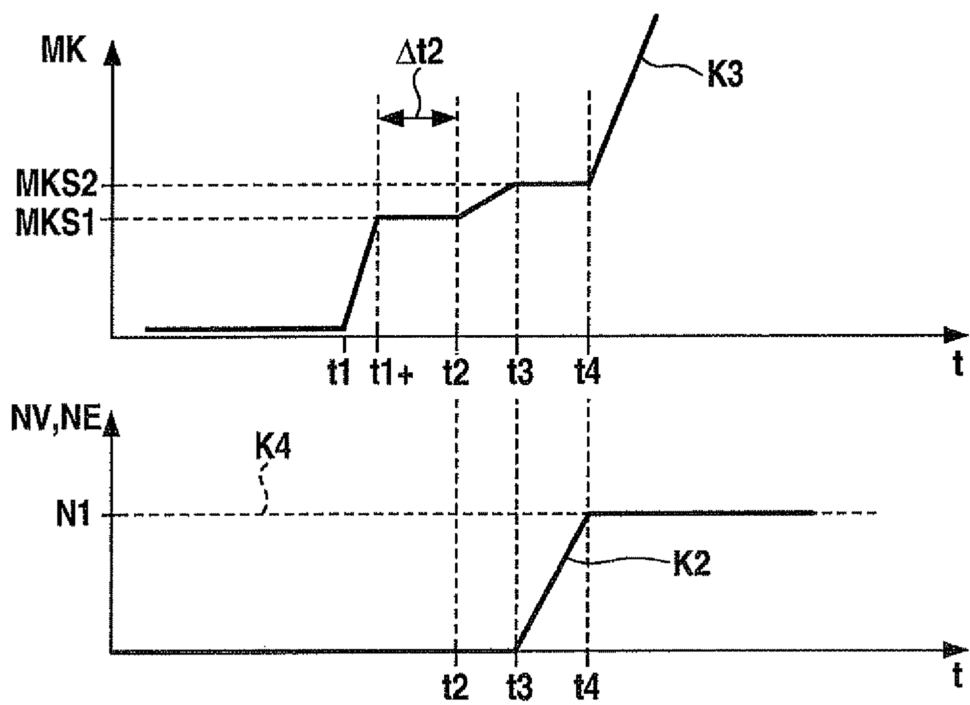
FIG. 4 shows rotational speed and slip torque as a function of time in a diagram.

In addition, when this is recognized, a further increase in the instantaneous setpoint value of the slip torque is triggered. This may take place optionally via a ramp or via an additional jump of the setpoint value. This is now elucidated with reference to FIG. 4 and FIG. 5. FIG. 4 shows again, in two diagrams, clutch torque MK and rotational speed N as a function of time t. Up to point in time t1, vehicle 100 is driven only by electric machine 4. Clutch 3 (FIG. 1) is therefore disengaged and isolates internal combustion engine 2 from the remaining components of hybrid drive 1. At point in time t1, hybrid drive 1 requires more power, which makes a start of internal combustion engine 2 necessary. Therefore, at point in time t1, the slip torque of clutch 3 is increased until it reaches setpoint value MKS1. After reaching setpoint value MKS1 at point in time t1+, a timing element is started for a time period Δt2. If, after the elapse of this time period, i.e., at point in time t2, a rotation of internal combustion engine 2 has still not been detected, setpoint value MKS1 is incremented to an increased setpoint value MKS2. Using this setpoint value MKS2, a successful start occurs. Internal combustion engine 2 is then successfully set into rotation at point in time t3, and at point in time t4 it reaches rotational speed N1 of electric machine 4.

Figure 5:
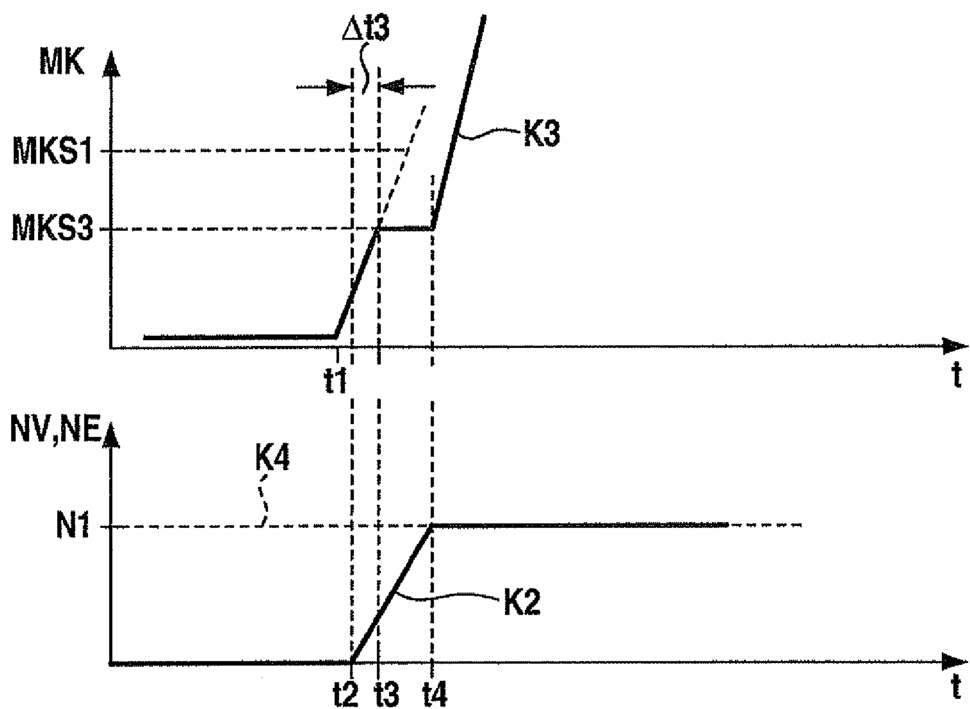
FIG. 5 shows rotational speed and slip torque as a function of time in a diagram.

With reference to FIG. 5, the case is described where internal combustion engine 2 starts rotating even before the elapse of a time interval predefined by a timing element, so that a successful start is to be expected. It is again assumed that vehicle 100 is driven only by electric machine 4 of hybrid drive 1 until point in time t1. At point in time t1, more power is required, which makes the start of internal combustion engine 2 necessary. As a result, starting with point in time t1, the slip torque of clutch 3 is increased in order to reach the predefined setpoint value MKS1 of the slip torque. At the same time, a timing element which defines a time interval Δt3 is started. As early as at point in time t2, i.e., before the elapse of time interval Δt3 and before setpoint value MKS1 is reached, a start of rotation of internal combustion engine 2 is detected. Thereupon, after the elapse of time interval Δt3, i.e., at point in time t3, the setpoint value of the slip torque is set at the lower value MKS3. Internal combustion engine 2 is further accelerated and, at point in time t4, reaches rotational speed N1 of electric machine 2.

Figure 6:
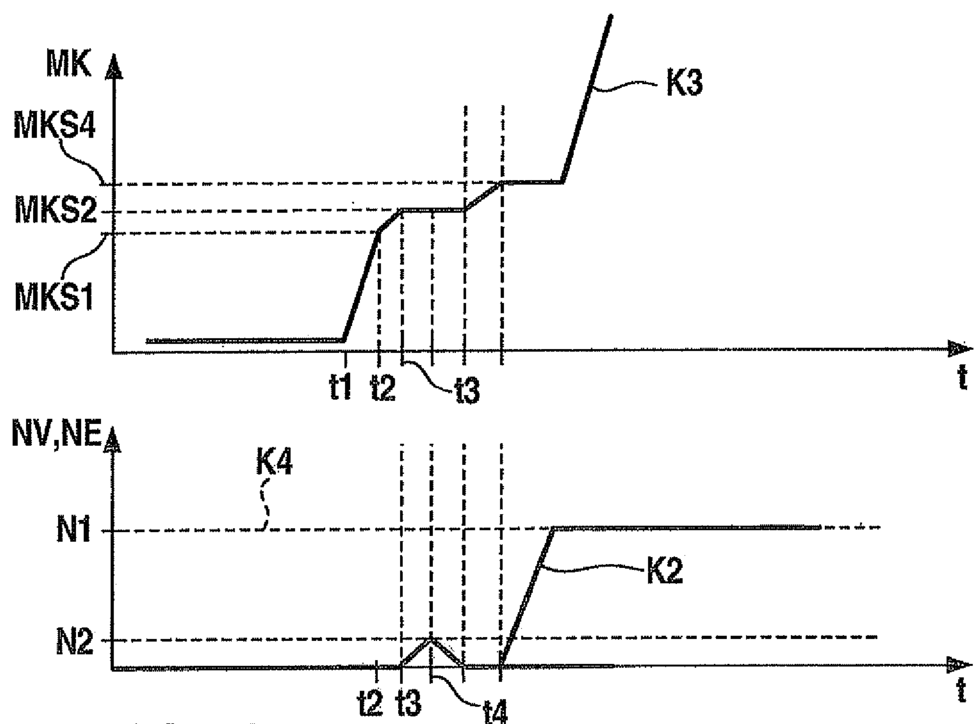
FIG. 6 shows rotational speed and slip torque as a function of time in a diagram.

In the following, an example embodiment is described with reference to FIG. 6, in which, during the slip phase of clutch 3, initially a rotation of clutch-connected internal combustion engine 2 is detected, whose rotational speed, however, then drops again. FIG. 6 also shows, again in two diagrams, clutch torque MK and rotational speeds NE, NV as a function of time t. It is again assumed that vehicle 100 is driven only by electric machine 4 of hybrid drive 1 until point in time t1. At point in time t1, more power is required, which makes the start of internal combustion engine 2 necessary. The slip torque of clutch 3 is therefore initially increased to a predefinable setpoint value MKS1, which is reached at point in time t2. Since even with setpoint value MKS1 a start of internal combustion engine 2 has still not been achieved, at point in time t2 the setpoint value is incremented to the higher setpoint value MKS2. This results in a start of internal combustion engine 2 at point in time t3. However, at point in time t4, the rotational speed of internal combustion engine 2 reaches a relatively low maximum N2 and subsequently drops again. This indicates an unsuccessful start. This characteristic sequence may, however, be used to prepare a more successful start as rapidly as possible. Namely, if the beginning of a rotation of internal combustion engine 2 is initially detected in the slip phase of clutch 3, but this rotation only reaches a relatively low level, i.e., remains far below rotational speed N1 of electric machine 2, and then drops again, this is a sure sign that internal combustion engine 2 could not be started. A higher slip torque MKS4 is then immediately set in order to still achieve a start of internal combustion engine 2 as rapidly as possible.

Figure 8:
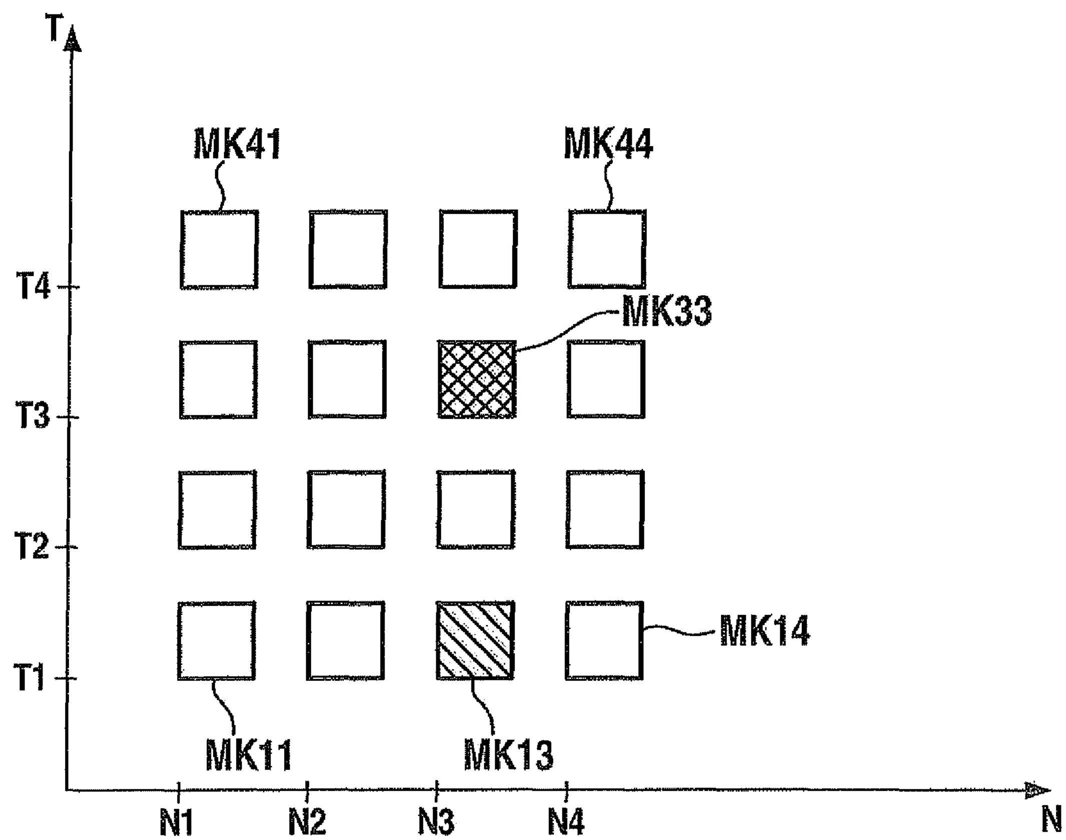
FIG. 8 shows a characteristics map.

It is advantageous in particular to save the setpoint values of the slip torque dependent on performance parameters of vehicle 100 such as, for example, temperature, rotational speed, and aging, in a characteristics map or a plurality of characteristics maps. Different learning points are then obtained for different operating points. One exemplary embodiment of a characteristics map of this type is illustrated in FIG. 8. The characteristics map shows ranges of slip torque MK11, MK12, . . . MK44 as a function of rotational speed N and temperature T. For example, at rotational speed N3 and temperature T1, slip torque MK13 is selected. At rotational speed N3 and temperature T3, slip torque MK33 is selected.

Furthermore, it is advisable to filter the long-term adaptation values during learning in order to prevent individual extreme values from causing frequent error responses.

Furthermore, measures which deactivate the learning function under special circumstances are advisable. Such a circumstance exists, for example, if internal combustion engine 2 is already running when a start sequence is to be initiated or if internal combustion engine 2 is still decelerating.

Figure 7:
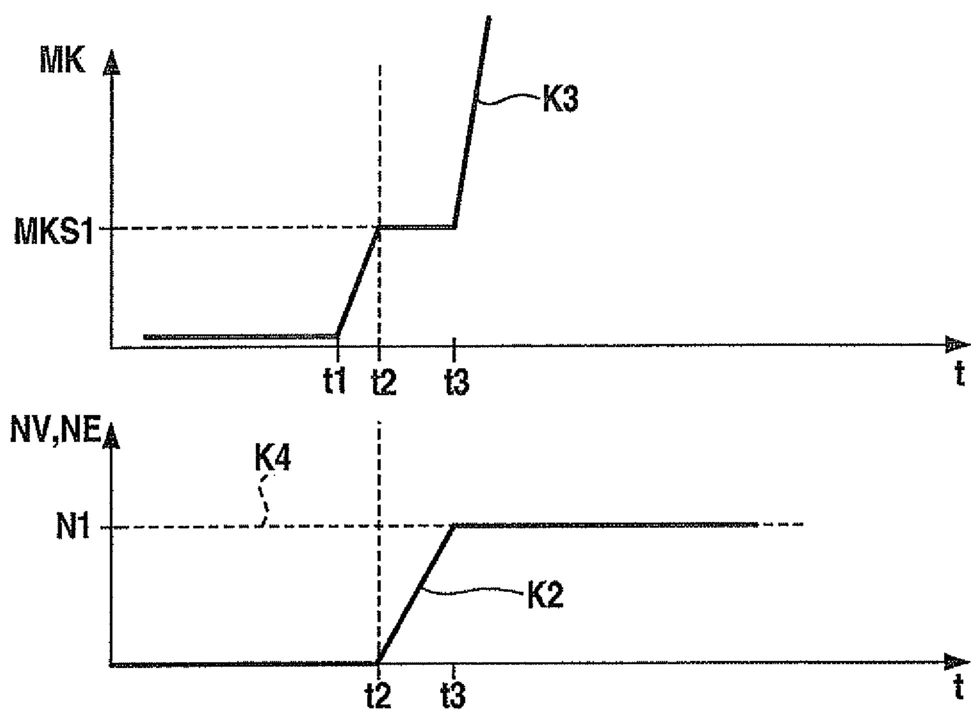
FIG. 7 shows rotational speed and slip torque as a function of time in a diagram.

With reference to FIG. 7, another ideal clutching sequence at optimum start is described in the following. FIG. 7 also shows, again in two diagrams, clutch torque MK as a function of time t (upper diagram) and rotational speeds NE, NV as a function of time t (lower diagram). Again, up to point in time t1, vehicle 100 is driven only by electric machine 4. Then more power is required, which may be generated only by internal combustion engine 2. In order to start the internal combustion engine, the slip torque of clutch 3 is increased until it reaches setpoint value MKS1 at point in time t2. Internal combustion engine 2 is accelerated at constant slip torque MKS1, until it reaches rotational speed N1 of the electric machine at point in time t3. At this point in time clutch 3 is fully engaged. A successful start of internal combustion engine 2 has been achieved.

What is claimed is:

1. A method for controlling a hybrid drive of a vehicle, having at least one internal combustion engine, at least one electric machine, a first clutch situated between the electric machine and a drive train of the vehicle, and a second clutch situated between the electric machine and the internal combustion engine, comprising:

applying a predefinable clutch torque to the second clutch for a start of the internal combustion engine by the operating electric machine;

monitoring a rotational speed of the internal combustion engine; and incrementing the clutch torque to a higher value if the rotational speed of the internal combustion engine is less than a predefinable threshold value within a predefinable time interval, wherein the clutch torque resulting in a successful start of the internal combustion engine is predefined as a setpoint value for a subsequent start of the internal combustion engine.

2. A method for controlling a hybrid drive of a vehicle, having at least one internal combustion engine, at least one electric machine, a first clutch situated between the electric machine and a drive train of the vehicle, and a second clutch situated between the electric machine and the internal combustion engine, comprising:

applying a predefinable clutch torque to the second clutch for a start of the internal combustion engine by the operating electric machine;

monitoring a rotational speed of the internal combustion engine; and incrementing the clutch torque to a higher value if the rotational speed of the internal combustion engine is less than a predefinable threshold value within a predefinable time interval, wherein, for the start of the internal combustion engine, a setpoint value of a slip torque is predefined and a timing element predefining a time interval is simultaneously started, the rotational speed of the internal combustion engine is monitored, and when the start speed of the internal combustion engine is reached before elapse of the time interval predefined by the timing element, the setpoint value is changed.

3. The method according to claim 2, wherein the setpoint value of the slip torque is reduced to a lower value.

4. A method for controlling a hybrid drive of a vehicle, having at least one internal combustion engine, at least one electric machine, a first clutch situated between the electric machine and a drive train of the vehicle, and a second clutch situated between the electric machine and the internal combustion engine, comprising:

applying a predefinable clutch torque to the second clutch for a start of the internal combustion engine by the operating electric machine;

monitoring a rotational speed of the internal combustion engine; and incrementing the clutch torque to a higher value if the rotational speed of the internal combustion engine is less than a predefinable threshold value within a predefinable time interval, wherein, when a brief speed increase and a subsequent speed drop of the internal combustion engine is detected, a slip torque is immediately incremented to a higher value.

5. The method according to claim 4, wherein the values of the slip torque are saved in a characteristics map.

6. The method according to claim 4, wherein the values of the slip torque modified by adaptation are filtered in order to avoid extreme values.

7. A method for controlling a hybrid drive of a vehicle, including at least one internal combustion engine, at least one electric machine, a first clutch situated between the electric machine and a drive train of the vehicle, and a second clutch situated between the electric machine and the internal combustion engine, comprising:

applying a predefinable clutch torque to the second clutch for a start of the internal combustion engine by the operating electric machine;

monitoring a rotational speed of the internal combustion engine; and decrementing the clutch torque to a lower value if the rotational speed of the internal combustion engine is greater than a predefinable threshold value within a predefinable time interval.

8. The method according to claim 7, wherein the clutch torque resulting in a successful start of the internal combustion engine is predefined as a setpoint value for a subsequent start of the internal combustion engine.

9. The method according to claim 7, wherein, for the start of the internal combustion engine, a setpoint value of a slip torque is predefined and a timing element predefining a time interval is simultaneously started, the rotational speed of the internal combustion engine is monitored, and when the start speed of the internal combustion engine is reached before elapse of the time interval predefined by the timing element, the setpoint value is changed.

10. The method according to claim 9, wherein the setpoint value of the slip torque is reduced to a lower value.

11. The method according to claim 7, wherein, when a brief speed increase and a subsequent speed drop of the internal combustion engine is detected, a slip torque is immediately incremented to a higher value.

12. The method according to claim 11, wherein the values of the slip torque are saved in a characteristics map.

13. The method according to claim 11, wherein the values of the slip torque modified by adaptation are filtered in order to avoid extreme values.

14. A method for controlling a hybrid drive of a vehicle, having at least one internal combustion engine, at least one electric machine, a first clutch situated between the electric machine and a drive train of the vehicle, and a second clutch situated between the electric machine and the internal combustion engine, comprising:

when the first clutch is disengaged and thus the drive train of the vehicle is isolated from the electric machine and the internal combustion engine, increasing a slip value of the second clutch along a ramp until the internal combustion engine is started; and saving the slip value of the second clutch corresponding to the start of the internal combustion engine and a corresponding torque of the electric machine as setpoint values.

15. The method according to claim 14, wherein, for the start of the internal combustion engine, a setpoint value of a slip torque is predefined and a timing element predefining a time interval is simultaneously started, the rotational speed of the internal combustion engine is monitored, and when the start speed of the internal combustion engine is reached before elapse of the time interval predefined by the timing element, the setpoint value is changed.

16. The method according to claim 15, wherein the setpoint value of the slip torque is reduced to a lower value.

17. The method according to claim 14, wherein, when a brief speed increase and a subsequent speed drop of the internal combustion engine is detected, a slip torque is immediately incremented to a higher value.

18. The method according to claim 17, wherein the values of the slip torque are saved in a characteristics map.

19. The method according to claim 17, wherein the values of the slip torque modified by adaptation are filtered in order to avoid extreme values.

* * * * *

UNITED STATES PATENT AND TRADEMARK OFFICE
CERTIFICATE OF CORRECTION

PATENT NO. : 8,651,998 B2
APPLICATION NO. : 12/304157
DATED : February 18, 2014
INVENTOR(S) : Schenk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1347 days.

Signed and Sealed this
Twenty-ninth Day of September, 2015

Michelle K. Lee

Michelle K. Lee
*Director of the United States Patent and Trademark Office*